No. 709,463. Patented Sept. 23, 1902.
F. BOOTH.
CHAINLESS BICYCLE.
(Application filed Oct. 14, 1901.)
(No Model.)
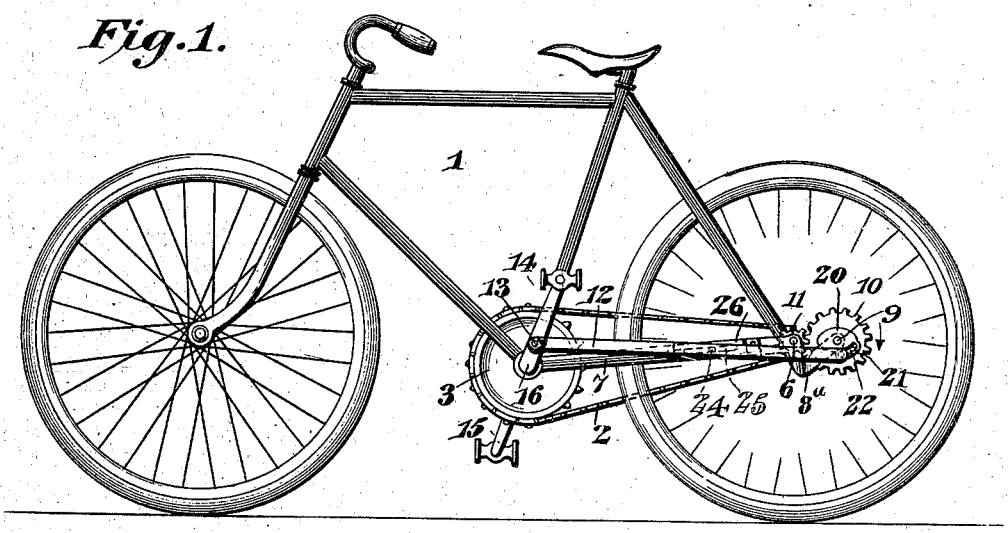
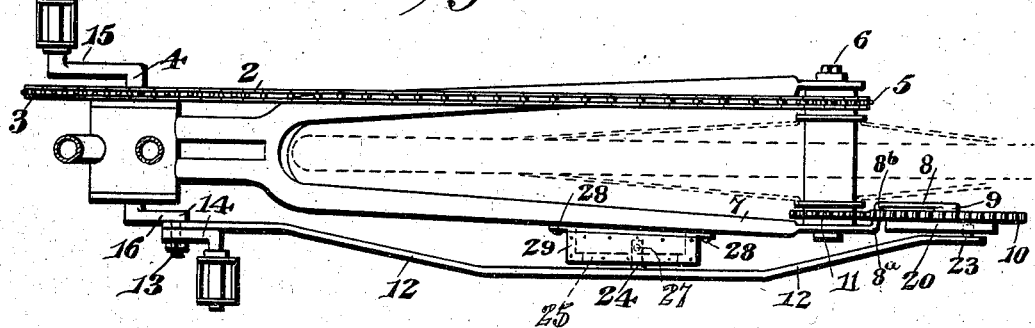
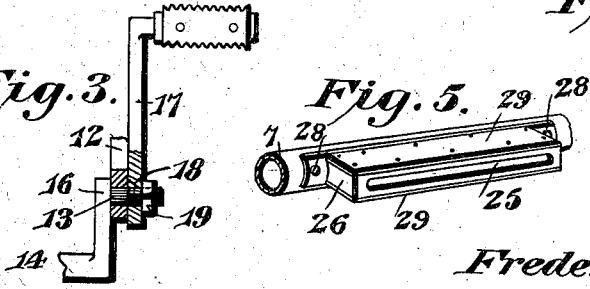
Frederick Booth, Inventor:
Witnesses:

UNITED STATES PATENT OFFICE.

FREDERICK BOOTH, OF TEFFT, INDIANA.

CHAINLESS BICYCLE.

SPECIFICATION forming part of Letters Patent No. 709,463, dated September 23, 1902.

Application filed October 14, 1901. Serial No. 78,642. (No model.)

*To all whom it may concern:*

Be it known that I, FREDERICK BOOTH, a citizen of the United States, residing at Tefft, in the county of Jasper and State of Indiana, have invented a new and useful Chainless Bicycle, of which the following is a specification.

This invention relates to bicycles, and more particularly to that class known as "chainless" bicycles.

The object of the invention is in a simple, positive, and feasible manner and without the employment of intricate and cumbersome mechanism and with the output of the minimum of energy, to secure the maximum of driving power.

A further object is to present a novel form of driving mechanism for bicycles which will combine great simplicity of construction, high efficiency of durability in use, and a minimum of danger of derangement or breakage in use.

A further object is to provide a driving mechanism for a bicycle in the use of which the machine may be checked or stopped, thereby obviating the necessity of employment of brake mechanism.

A further object is to provide a driving mechanism which may be applied to a bicycle of ordinary construction without necessitating any radical change in its structural arrangement and which may be readily removed from the machine for purposes of cleansing or repair.

With these and other objects in view, as will appear as the nature of the invention is better understood, the same consists in the novel construction and combination of parts of a driving-gear for bicycles, as will be hereinafter fully described and claimed.

In the accompanying drawings, forming a part of this specification, and in which like numerals of reference indicate corresponding parts, I have illustrated a form of embodiment of my invention capable of carrying my ideas into effect, it being understood that the manner of construction and arrangement of parts shown may be changed or varied without departing from the spirit of the invention, and in these drawings—

Figure 1 is a view in side elevation, exhibiting a bicycle equipped with my improvements. Fig. 2 is a view in plan on an enlarged scale. Fig. 3 is a segregated detail view, in front elevation, partly in section, of one of the driving-cranks. Fig. 4 is a view in elevation of the driving-gear. Fig. 5 is a perspective detail view of a guide constituting a fulcrum to be engaged by the rod connecting the crank and the driving-gear.

Referring to the drawings, 1 designates generally a bicycle, which may be of any preferred construction, and therefore needs no detailed description. As herein shown, the bicycle is of the ordinary diamond-frame type adapted for male riders; but it is to be understood that the invention is equally adaptable for drop-frame bicycles used by female riders. As shown in Fig. 2, a sprocket-chain 2 is employed, this chain passing around the usual sprocket-wheel 3, carried by the crank-shaft 4, and around a similar wheel 5, carried by the rear hub 6. The only change in the structural arrangement of the bicycle to accommodate my improved driving mechanism consists in providing one of the lower frame-bars 7 with an extension 8, (shown in Fig. 2,) and on this extension is a stud 9, carrying a driving-gear 10. In addition to the extension 8 and driving-gear 10 the hub 6 of the rear wheel is provided on the end opposite that carrying the sprocket-wheel 5 with a gear-wheel 11, meshing with the gear 10, the gear 10 being driven by a connecting-rod 12, having its forward end mounted on a wrist-pin 13, carried by a two-part crank 14, the throw of which is the same as the crank 15 on the opposite end of the crank-shaft. It will here be noted that the extension of the frame-bar 7 is dropped downwardly, as indicated at 8ª, to a point below the gear 10, as indicated in Fig. 1, and then deflected laterally inward, as indicated at 8ᵇ in Fig. 2, so as to pass to the inner side of the gear, where it is inclined upwardly, so as to support the gear 10 in proper relation with respect to the gear 11, whereby the outer face of the gear 10 is unobstructed by the supporting-frame.

As shown in Fig. 3, the member 16 of the crank 14, that is secured to the crank-shaft, is provided with the wrist-pin 13, that portion of the pin engaged by the connecting-rod being circular in cross-section and that portion engaged by the pedal member 17 being square, as shown at 18, a nut 19, turned on the outer end of the wrist-pin, serving to hold the pedal member 17 rigidly associated with the wrist-pin, the disposition of the members of the crank being such that the connecting-rod will be free to work therebetween.

The driving-gear 10 is provided with a plate 20, bearing an offset 21, having a cam-groove 22 formed therein tangential to the axis of rotation of the driving-gear, the said groove to be engaged by a stud or projection 23, carried by the connecting-rod 12. The connecting-rod has at a point intermediate of its ends a fulcrum-stud 24, which works in a slot 25, formed in a guide 26, secured to the frame-bar 7 of the bicycle, a pin 27, passed through the fulcrum-stud and bearing against the inner side of the guide 26 on each side of the slot, serving to hold the rod in operative relation to the guide and to prevent disengagement of the stud 23 from the cam-groove 22. The guide 26 is herein shown as a rectangular piece of metal held assembled with the frame-bar 7 by bolts 28, and while this form of guide will be found efficient in use it is to be understood that the invention is not to be limited to this precise construction, as other forms may be employed and still be within the scope of the invention. To preclude entrance of dust to the guide, a shield 29 is employed, which covers the upper and lower sides of the guide, as shown in Figs. 2 and 5. While not herein shown, it is to be understood that the studs 23 and 24 may be provided with roller-bearings where they contact, respectively, with the cam-groove 22 and the guide 26, and as this is an old and well-known expedient for reducing friction between parts detailed illustration is deemed unnecessary.

The operation of my improved driving mechanism is as follows: With the parts in the position shown in Fig. 1 and with the stud 23 adjacent to or in engagement with the front end of the cam-groove 22 pressure is applied to the pedals, so as to draw the connecting-rod 12 in a forward direction, and a continuation of the movement of the pedal-cranks will rock the rear end of the bar upwardly, thereby rotating the gear 10 in the direction of the arrow shown in Fig. 1, and through the medium of the gear 11 upon the hub of the rear wheel the latter is rotated to move the bicycle in a forward direction.

It will be observed that while the connecting-rod has a reciprocatory movement, this being necessary in order to permit the crank 14 to rotate through a circle, this movement through the medium of the fulcrum-pin 24 is converted into rotary motion, thereby to drive the gear 10 and through the medium of the gear-wheel 11 the driving-wheel of the machine.

In my experiments I have determined that a relatively fixed pivotal connection between the rear end of the driving-rod 12 and the gear 10 is ineffectual to impart rotary movement to said gear, as the rear end of the rod describes an elliptical path, and therefore must have a loose or slidable connection in addition to its pivotal connection with the gear, and I have therefore provided the cam-groove or seat for the reception of the pivot-stud 23, so as to permit of the stud traveling in an elliptical path. It will of course be understood that it is not necessary that the pivot-stud be in engagement with one end of the groove or seat to impart motion to the gear 10, as pressure upon either side of the seat and at any point between the opposite ends thereof will result in a turning of the gear, as the connection between the driving-rod and the gear is at one side of the center thereof, and therefore it is apparent that the stud 23 is adapted to play back and forth in the seat 22, so as to be active throughout the length of said seat, and is not limited to a position at one end thereof.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

What I claim is—

1. A bicycle having one of its lower frame-bars extended rearward from the rear axle, a driven gear upon the rear hub, a driving-gear mounted on the extension and meshing with the rear of the driven gear, and a lever fulcrumed for reciprocatory movement upon one of the frame-bars and having one end in engagement with the driving-gear and the other end in engagement with one of the pedal-cranks.

2. In a bicycle, the combination with the frame thereof, the rear wheel and the pedal-crank shaft, of a driven gear carried by the rear hub, the adjacent lower frame-bar being extended downwardly below and in rear of the driven gear, thence extended inwardly beyond the gear, and then projected rearwardly, a driving-gear mounted upon the outer side of the rear end of the extended frame portion and in mesh with the driven gear, and a connecting-rod between the driving-gear and the adjacent pedal-crank.

In testimony that I claim the foregoing as my own I have hereto affixed my signature in the presence of two witnesses.

FREDERICK BOOTH.

Witnesses:
SARAH GILLIPSIE,
REBECCA MILLER.